United States Patent [19]

Theiler

[11] 4,379,794

[45] * Apr. 12, 1983

[54] PROCESS FOR PREPARING COOKED BACON HAVING REDUCED LEVELS OF N-NITROSAMINES

[75] Inventor: Richard F. Theiler, Scottsdale, Ariz.

[73] Assignee: Armour and Company, Phoenix, Ariz.

[*] Notice: The portion of the term of this patent subsequent to Feb. 9, 1999, has been disclaimed.

[21] Appl. No.: 335,040

[22] Filed: Dec. 28, 1981

Related U.S. Application Data

[63] Continuation-in-part of Ser. No. 196,816, Oct. 14, 1980, Pat. No. 4,315,015.

[51] Int. Cl.³ ............................................. A23B 4/02
[52] U.S. Cl. .................................. 426/266; 426/332; 426/641; 426/652
[58] Field of Search ............... 426/264, 265, 266, 281, 426/332, 335, 533, 641, 646, 650, 652

[56] References Cited

U.S. PATENT DOCUMENTS

| | | |
|---|---|---|
| 2,770,550 | 11/1956 | Hall et al. |
| 2,863,777 | 12/1958 | Dekker et al. |
| 2,902,369 | 9/1959 | Komarik |
| 2,974,047 | 3/1961 | Hohmes |
| 3,672,913 | 6/1972 | Podebradsky |
| 3,868,468 | 2/1975 | Tompkin ............... 426/243 |
| 3,901,981 | 8/1975 | Draudt ................. 426/266 |
| 3,966,974 | 6/1976 | Bharucha et al. ..... 426/265 |
| 4,112,133 | 9/1978 | Rao et al. ............. 426/650 |
| 4,250,199 | 2/1981 | Underwood et al. .. 426/533 |
| 4,315,015 | 2/1982 | Theiler ................. 426/266 |

FOREIGN PATENT DOCUMENTS

549657 12/1957 Canada ............................ 426/266
411006 5/1934 United Kingdom ............ 426/266

OTHER PUBLICATIONS

Gorbatov et al., Liquid Smokes for Use in Cured Meats, *Food Technology*, 25, 71–77, (1971).
Booth et al., A New Approach to Wood Smoke Flavoring, *Food Trade Review*, 25, 26, 32, Jun. 1971.
*Red Arrow Products Technical Directory*, pp. 1–32.
Knowles et al., Nitrosation of Phenols in Smoked Bacon, *Nature*, 249, pp. 672–673, Jun. 1974.
Knowles et al., Phenols in Smoked Cured Meats, Phenolic Composition, etc., *J. Sci. Fd. Agric.*, 26, pp. 189–196, 1975.
Knowles et al., Phenols in Smoked Cured Meats: Nitrosation of Phenols, etc., *J. Sci. Fd. Agric.*, 26, pp. 267–276, 1975.
Davies et al., Catalytic Effect of Nitrosophenols on N-Nitrosamine Formation, *Nature*, 266, pp. 657–658, Apr. 1977.

*Primary Examiner*—Arthur L. Corbin
*Attorney, Agent, or Firm*—Frank T. Barber

[57] ABSTRACT

A process for preparing cured bacon which, when cooked for consumption, contains substantially reduced levels of N-nitrosamines. The process comprises the steps of nitrite-curing, heat processing and slicing bacon bellies and then spraying or otherwise applying to the resulting slices, before cooking, a treating solution containing liquid smoke and a reducing sugar.

10 Claims, No Drawings

PROCESS FOR PREPARING COOKED BACON HAVING REDUCED LEVELS OF N-NITROSAMINES

CROSS-REFERENCE TO RELATED APPLICATIONS

This application is a continuation-in-part of co-pending application Ser. No. 196,816, filed Oct. 14, 1980, entitled "Process for Preparing Cooked Bacon Having Reduced Levels of N-Nitrosamines", now U.S. Pat. No. 4,315,015.

BACKGROUND OF THE INVENTION

This invention relates to a process for preparing bacon and, more particularly, to a process for preparing bacon which, when cooked, will have reduced levels of N-nitrosamines.

For many years it has been common practice to prepare cured bacon by treating green (uncured) bellies with a curing solution (hereinafter "pickle") and then smoking the cured bacon to impart a desirable flavor. A major component of the pickle is sodium nitrite which inhibits the germination of Clostridium botulinum spores, thus ensuring that the cured bacon will be free of the deadly toxin produced by this bacterium. In recent years, however, much controversy has surrounded the use of sodium nitrite because there have been allegations that residual nitrite from the pickle can react with organic amines present in various cured pork products to form carcinogenic nitrosamines. This problem is accentuated with bacon because nitrosamine formation is induced by the elevated temperatures encountered when the bacon is cooked for consumption; i.e., those exceeding 300° F.

Many approaches have been considered in seeking a remedy to this problem and proposed remedies have included eliminating nitrite from the pickle or reducing residual nitrite levels in the cured product. Neither of these approaches is particularly satisfactory, however, because there is presently no suitable substitute for nitrite, and because reducing nitrite levels could increase the likelihood that C. botulinum spores would grow in the cured bacon.

My co-pending application Ser. No. 196,816, supra, describes an invention which is based on the discovery that cured bacon having substantially reduced levels of N-nitrosamines when cooked can be prepared by injecting whole green bellies with a curing solution containing nitrite and either a reducing sugar alone or a combination of a reducing sugar and a liquid smoke. In said invention the reducing sugar is used in concentration to provide from 150 to 10,000 ppm, based upon the green weight of the bacon bellies, and the liquid smoke is used in concentration to provide 5 to 400 ppm phenols and 10 to 2,000 ppm carbonyl compounds, based upon the green weight of the bacon bellies. Bacon made in accordance with said invention contains reduced levels of N-nitrosamines, while at the same time the levels of residual nitrite present in the uncooked cured product remain relatively unaffected, thus ensuring that the germination of C. Botulinum spores will be prevented. In addition, the flavor of the product when cooked for consumption is remarkably improved.

SUMMARY OF THE PRESENT INVENTION

The present invention is based on the discovery that substantially reduced levels of N-nitrosamines can be achieved if the reducing sugar, or the combination of reducing sugar and liquid smoke, is applied at a later stage—namely, after the bacon bellies have been cured, heat processed, and sliced, but before cooking. For example, rather than incorporate the reducing sugar, or the combination of reducing sugar and liquid smoke, in the curing solution to be injected into the bellies, it is possible to apply these reagents, by spraying, dipping or other equivalent means, to the surface of the bacon slices after leaving the slicing machine.

The process of the present invention therefore comprises the steps of nitrite-curing, heat processing and slicing bacon bellies and then applying to the resulting slices, before cooking, a reducing sugar, either alone or in combination with a liquid smoke. The reducing sugar is present in concentration to provide 150 to 10,000 ppm, based on the weight of the sliced bacon, and the liquid smoke is present in concentration to provide 5 to 400 ppm phenols and 10 to 2,000 ppm carbonyl compounds, based on the weight of the sliced bacon.

DESCRIPTION OF THE PREFERRED EMBODIMENTS

In the practice of the present invention, we may use as starting material any nitrite-cured bacon which has been cured, processed and sliced according to standard procedures which are well-documented in the art. See for example U.S. Pat. No. 3,595,679.

Cured bacon is typically prepared by immersing whole green bellies in pickle for a prescribed period of time or by injecting the pickle directly into the green bellies. Commercial procedures most commonly involve injection of the bellies because the curing process can be rapidly and efficiently completed. When cured in this way a quantity of pickle usually constituting 8–15% of the weight of the meat is injected; thus for example, if a 7-kilogram bacon belly were pumped (i.e., injected) with pickle at a level of 10%, a quantity of 700 grams of pickle would be used. The pickle normally contains a number of ingredients in addition to sodium nitrite. These include buffering agents such as sodium tripolyphosphate to stabilize the nitrite, agents to facilitate curing such as sodium erythorbate or ascorbic acid, and sodium chloride.

Following the step of injecting or otherwise introducing the curing pickle, the bacon bellies are normally drained for a period of time, combed and hung on trees in the conventional smokehouse manner, and then placed in heated, smoke-laden currents of air in the smokehouse. The times, temperatures and other conditions utilized in conventional smokehouse processing are well documented in the art. For example, in one such conventional procedure, cured bacon bellies are placed in a smokehouse at a temperature of 140°–145° F. and are held there until the internal temperature of the meat reaches about 130°–132° F. which will ordinarily require four to five hours in an air-conditioned smokehouse. The temperature of the house is then lowered to about 130° F. and held for another eight hours until the bellies are properly finished.

It is to be noted that, although liquid smoke may be used as a source to provide the smoke-laden currents of air in the processing step just described, application of liquid smoke in this manner and at this stage of the process is not effective to bring about any significant reduction of N-nitrosamines when the bacon is cooked for consumption.

Following the smokehouse processing step, the bellies are chilled in the ordinary manner in a bacon chill freezer for a period of 24 to 48 hours until the internal temperature is in the neighborhood of 24°–26° F., and then the bellies are subjected to pressure in a molding box or machine of conventional design and operation, the purpose of this being to square up the slab so that the slices obtained in the subsequent slicing operation will be as uniform as possible. The bellies are then sliced on high speed, rotary blade slicing machines to provide bacon slices which normally have a thickness in the range of 0.08 to 0.125 in.

In the practice of the present invention, bacon slices which have been produced in any of the conventional industry procedures are treated by applying to their surfaces either a reducing sugar alone or a combination of reducing sugar and a specially modified liquid smoke.

Reducing sugars, as used in the invention, are those sugars which will reduce mild oxidizing agents such as Fehling's solution, Tollen's Reagent and Benedict's solution, and examples of such sugars are glucose, maltose, fructose and lactose. Non-reducing sugars, such as sucrose, have virtually no effect on N-nitrosamine formation.

Liquid smoke, as used in the invention, should be of a modified form having relatively reduced levels of color-forming constituents, in order to prevent discoloration of the bacon slices in this topical application of the smoke to the surface of the slices. An appropriate form of liquid smoke is Aro-Smoke, a product of Red Arrow Products Company, having a carbonyl to phenol ratio of approximately 1.4 to 1.

An alternative form of liquid smoke may be prepared using the following procedure: An aqueous solution of wood smoke is prepared and refined by means well known in the art or, if so desired, a commercial aqueous wood smoke, such as Red Arrow's CharSol C-10, (which has a carbonyl to phenol ratio of 7.1 to 1) may be used as the starting solution. The pH of the solution is adjusted to ca 10–11 with an appropriate base, such as sodium hydroxide, and the mixture is extracted with diethyl ether to remove certain of the carbonyl-containing compounds. The aqueous solution is reacidified to a pH of ca 2–3 with an appropriate acid, such as hydrochloric acid, and the mixture is extracted with diethyl ether. After evaporation of the ether, a water-insoluble extract is obtained for which the ratio of carbonyl-containing compounds to phenolic constituents is in the range of 0.5–5 to 1. Preferably, this ratio will be in the range of 0.75–3 to 1.

If it is desired to use the above water-insoluble extract in an aqueous treating solution, it is preferable to include a food grade emulsifier. A wide range of emulsifiers is available and the effective amount of emulsifier required will depend on the characteristics displayed by each individual emulsifier. Polysorbate emulsifiers are generally satisfactory to practice the present invention, and polysorbate 80 is particularly preferred when not less than 0.2% of emulsifier is used, based on the weight of the solution. Certain other emulsifiers which provide suitable emulsification may also exhibit other characteristics which make them less desirable to use. Lecithin, for example, has been shown to increase N-nitrosopyrrolidine formation. Therefore, in view of the result which is to be achieved by utilizing the process of the present invention, emulsifiers which exhibit this tendency should be avoided.

A preferred way of carrying out the process of the invention is to prepare a treating solution containing either the reducing sugar alone or in combination with the liquid smoke and then spraying the solution on the surface of the slices as they leave the slicing machine and are carried on a conveyor belt to the weighing and packaging area. Any suitable equipment involving nozzles which provide atomization or spray application may be utilized. For example, a Preval sprayer unit, manufactured by Precision Valve Corporation, Yonkers, N.Y., is useful in the practice of the invention. Other means of application, such as dipping or immersing the slices in a bath of treating solution, are also contemplated by the invention.

The amounts of reducing sugar and liquid smoke which are added to the treating solution can vary depending on a number of factors, including the amount of treating solution that can be held on the surface of the bacon slices and the amount of flavor and color that is desired for the cooked bacon. However, when a quantity of treating solution is applied in concentration to provide 150 to 10,000 ppm of reducing sugars, 5 to 400 ppm of phenols and 10 to 2,000 ppm of carbonyl compounds, based upon the weight of the sliced bacon, N-nitrosamine levels in bacon when cooked for consumption will be reduced. To obtain superior flavor characteristics, the concentration range for the reducing sugars will be 500 to 6,000 ppm, the concentration range for the phenols will be 20 to 160 ppm and the concentration range for the carbonyls will be 10 to 800 ppm. More preferably, these ranges will be 1,000 to 3,000 ppm, 40 to 120 ppm and 30 to 360 ppm, respectively. When reducing sugar alone is used in the treating solution, concentrations comparable to those indicated above for the reducing sugar may be used.

In the practice of the present invention, it is of course essential that the inhibiting material (i.e., the reducing sugar alone or in combination with liquid smoke) be applied to the bacon slices prior to their being exposed to temperatures as high as, or approaching, those involved in cooking the bacon for consumption. It is believed that the formation of N-nitrosamines is catalyzed by temperatures approaching 300° F. or higher, and if the application of the inhibiting material, as in the present invention, is delayed until after the bacon slices have been subjected to such temperatures, either by frying or precooking, then significant quantities of N-nitrosamines may already have been formed prior to application of the inhibiting material, and the purpose of the invention may have been defeated.

An advantage of the present invention is that nitrites are used in the conventional manner and in the conventional quantities to cure and flavor the bacon and protect it against harmful organisms such as C. botulinum; and in addition the bacon contains substantially reduced levels of N-nitrosamines upon frying or cooking at high temperatures.

The following examples are illustrative of the practice of the invention. It will be understood of course that various modifications thereof can readily be evolved in view of the guiding principles and teachings provided herein.

EXAMPLE 1

A 200-ml quantity of CharSol C-10 was treated according to the procedure set forth above to give 8.4 g of oily extract. A 29% solution of the extract in polysorbate 80 was prepared and the phenolic- and carbonyl compound constituents of this smoke ("Prepared Smoke" as used in this Example) were assayed spectrophotometrically using 2,6-dimethoxyphenol and 2-butanone as the standards, respectively. From the assay results the carbonyl/phenol ratio was determined. Similar assays and ratio calculations were also made for Aro-Smoke (which contained ca 80% polysorbate), CharSol C-10, and Royal Smoke, another commercial aqueous liquid smoke from Griffith Laboratories. The following results were obtained.

| Sample | Phenols (mg/ml) | Carbonyls (mg/ml) | Ratio Carbonyls:Phenols |
|---|---|---|---|
| Prepared Smoke | 35 | 54 | 1.5:1 |
| Aro-Smoke | 39 | 54 | 1.4:1 |
| Royal Smoke | 7.5 | 79 | 10.5:1 |
| CharSol C-10 | 14 | 99 | 7.1:1 |

EXAMPLE 2

The following test results demonstrate that application of liquid smoke to the external surfaces of whole bellies during smokehouse processing has no significant effect in the reduction of N-nitrosamines in the cooked or fried bacon.

Twenty-four green skin-on bacon bellies were obtained, divided into two groups of 12, and skinned prior to processing. Both groups were pumped at levels of 13%, based on the weight of the bellies, with the following curing pickle:

| Ingredient | Percentage |
|---|---|
| Water | 85.64 |
| Sodium Chloride | 12.50 |
| Sodium Tripolyphosphate | 1.25 |
| Sodium Erythorbate Monohydrate | 0.50 |
| Sodium Nitrite | 0.10 |
| Veralock (a flavoring material) | 0.01 |

Both groups (Group A and Group B) were heat processed under identical conditions to cure the bacon, and the bellies in Group B were also externally smoked with atomized CharSol C-10 at ca five times the amount of liquid smoke normally employed in commercially produced bacon. The bellies were then chilled and two days later approximately 1-pound center drafts containing ca 17-18 slices per draft were taken from each belly.

Five days after slicing, bacon samples from each group were fried at 340° F. for three minutes per side, and the fried bacon was analyzed for N-nitrosamine content using N-nitrosopyrrolidine as the standard. The following results were obtained.

| Group | N—Nitrosopyrrolidine (ppb)* |
|---|---|
| A. No external smoke | 14 ± 5 |
| B. External smoke | 16 ± 3 |

*Data represents the mean ± the standard deviation from N = 16 different determinations.

EXAMPLE 3

Twelve skin-on bellies having green weights averaging 18 to 20 pounds were processed in a commercial packing plant according to USDA approved procedures. The processing involved injecting the bellies with a conventional curing pickle containing approximately 120 ppm sodium nitrite; combing and draining; processing in a smokehouse to an internal temperature of approximately 136°-140° F.; tempering; chilling; molding; and finally slicing and putting up in drafts consisting of approximately 500 grams of bacon, totaling 17 to 18 slices per draft, the average thickness of each slice being approximately 0.09 in.

Three of the center drafts from each of the 12 bellies were selected for testing, as follows:

| No. 1 Drafts (Control) | Received no treatment |
|---|---|
| No. 2 Drafts (Dextrose) | The slices in these drafts were sprayed with 6.25 grams of an aqueous solution of dextrose containing approximately 1.25 grams dextrose (2,500 ppm dextrose based on the weight of the bacon) |
| No. 3 Drafts (Dextrose plus Aro-Smoke) | The slices in these drafts were sprayed with 6.25 grams of an aqueous solution containing approximately 1.25 grams dextrose (2,500 ppm dextrose based on the weight of the bacon) and 1 gram Aro-Smoke (2,000 ppm Aro-Smoke based on the weight of the bacon) |

After the above spray application, the drafts were vacuum packaged, stored for 21 days at 36°-40° F., and then fried and analyzed. In the analysis for N-nitrosamines, 12 samples from each type of draft (36 total samples) were fried 3 minutes on each side in a preheated fry pan at 340° F. ± 10° F. After blotting the fried bacon slices with paper toweling (to remove excess fat), nitrosamine values were determined by Thermal Energy Analyzer (T.E.A.) methodology, following the procedures set forth in Fine et al, *Anal. Chem.*, 47, 1183 (1975). The results are set forth as follows:

| Treatment | N—Nitrosopyrrolidine (ppb)* | % Reduction of N—Nitrosopyrrolidine Compared to Control |
|---|---|---|
| No. 1 Drafts (Control) | 35.8 | — |
| No. 2 Drafts (Dextrose) | 15.1 | 57.8 |
| No. 3 Drafts (Dextrose plus Aro-Smoke) | 9.3 | 74.0 |

*Average of 12 different samples

I claim:

1. A process for preparing cured bacon which, when cooked for consumption, contains substantially reduced levels of N-nitrosamines, said process comprising the steps of nitrite-curing, heat processing and slicing bacon bellies and then applying to the resulting slices, before cooking, (a) a liquid smoke in concentration to provide 5 to 400 ppm phenols and 10 to 2000 ppm carbonyl compounds based upon the weight of the sliced bacon, and (b) from 150 to 10,000 ppm of reducing sugar, based upon the weight of the sliced bacon.

2. The process of claim 1 wherein said liquid smoke is in concentration to provide 20 to 160 ppm of phenols and 10 to 800 ppm of carbonyls, based on the weight of the sliced bacon, and said reducing sugar is in concentration to provide 500 to 6,000 ppm based on the weight of the sliced bacon.

3. The process of claim 1 wherein said liquid smoke is in concentration to provide 40 to 120 ppm of phenols and 30 to 360 ppm of carbonyls based on the weight of the sliced bacon, and said reducing sugar is in concentration to provide 1,000 to 3,000 ppm based on the weight of the sliced bacon.

4. A process for preparing cured bacon which, when cooked for consumption, contains substantially reduced levels of N-nitrosamines, said process comprising the steps of nitrite-curing, heat processing and slicing bacon bellies and then applying to the resulting slices, before cooking, a treating solution containing
   a liquid smoke in concentration to provide 5 to 400 ppm phenols and 10 to 2,000 ppm carbonyl compounds, based on the weight of the sliced bacon, the ratio of carbonyls to phenols being within the range of 0.5–5 to 1, and
   from 150 to 10,000 ppm of reducing sugar, based on the weight of the sliced bacon.

5. The process of claim 4 wherein the ratio of carbonyl to phenolic compounds is within the range of 0.75–3 to 1.

6. The process of claim 5 wherein said liquid smoke is in concentration to provide 20 to 160 ppm of phenols and 10 to 800 ppm of carbonyls, based on the weight of the sliced bacon, and said reducing sugar is in concentration to provide 500 to 6,000 ppm based on the weight of the sliced bacon.

7. The process of claim 5 wherein said liquid smoke is in concentration to provide 40 to 120 ppm of phenols and 30 to 360 ppm of carbonyls, based on the weight of the sliced bacon, and said reducing sugar is in concentration to provide 1,000 to 3,000 ppm based on the weight of the sliced bacon.

8. The process of claim 4 wherein said treating solution also contains an effective amount of a food grade emulsifier which does not substantially increase N-nitrosamine formation.

9. The process of claim 8 wherein said food grade emulsifier is a polysorbate emulsifier.

10. The process of claim 8 wherein said food grade emulsifier is polysorbate 80.

* * * * *